United States Patent [11] 3,624,054

| [72] | Inventors | Oliver A. Barton<br>Florham Park;<br>James H. Carroll, Verona; Frank S. Elkins,<br>Passaic; John G. Miller, Denville, all of N.J. |
|---|---|---|
| [21] | Appl. No. | 870,391 |
| [22] | Filed | Dec. 5, 1969 |
| [45] | Patented | Nov. 30, 1971 |
| [73] | Assignee | Allied Chemical Corporation<br>New York, N.Y. |

[54] CROSSLINKABLE LOW CHLORINE- AND-SULFUR-CONTENT POLYETHYLENE
2 Claims, No Drawings

[52] U.S. Cl. ........................................ 260/79.3 R,
204/159.2, 260/23 R, 260/79.5 R, 260/785, 260/793
[51] Int. Cl. ........................................ C08f 27/06, C08f 27/02, C08f 13/00
[50] Field of Search ........................................ 260/94.9 H, 79.3

[56] References Cited
UNITED STATES PATENTS

| 2,982,759 | 5/1961 | Heuse............................ | 260/79.3 |
| 3,050,503 | 8/1962 | Natta............................ | 260/79.3 |
| 3,228,744 | 1/1966 | Karn............................. | 8/115.5 |
| 3,282,910 | 11/1966 | Klug............................. | 260/94.9 |

FOREIGN PATENTS

| 235,096 | 8/1961 | Australia...................... | 260/79.3 |
| 851,127 | 10/1960 | Great Britain................. | 260/79.3 |
| 893,073 | 4/1962 | Great Britain................. | 260/79.3 |

*Primary Examiner*—Joseph L. Schofer
*Assistant Examiner*—C. A. Henderson, Jr.
*Attorneys*—Arthur J. Plantamura and Herbert G. Burkard

ABSTRACT: Cross-linked low chlorine- and sulfur-content sulfochlorinated polyethylene has superior properties over both cross-linked polyethylene and cross-linked high chlorine- and sulfur-content sulfochlorinated polyethylene. In addition, it possesses processing advantages over polyethylene and highly chlorosulfonated polyethylene.

CROSSLINKABLE LOW CHLORINE- AND-SULFUR-CONTENT POLYETHYLENE

BACKGROUND OF THE INVENTION

Electrical wiring is generally covered with a nonconductive insulating coating. Frequently, thermoplastics are used for such coating because of their cheapness and the facility with which they can be applied. For example, to apply a thermoplastic coating, it is only necessary to heat the plastic in an extruder to the softening point, coaxially extrude over the conductor, and cool the resulting composite structure to the point where the plastic hardens and develops toughness.

During severe service, however, the plastic covering of the wire may again be exposed to heat near its softening point, whereupon the plastic resoftens and sometimes flows off the conductor leaving it exposed.

Cross-linked, i.e., cured or vulcanized, polymer coatings overcome this difficulty of melting and flowing that occurs with thermoplastic coatings. Cross-linked chlorosulfonated polyethylene is one of the vulcanizable coatings used for covering conductors. In addition, certain procedures have been developed for cross-linking polyethylene. Unfortunately, both cross-linked polyethylene and the cross-linked chlorosulfonated polyethylenes utilized to date have significant shortcomings. For example, in the case of currently used chlorosulfonated polyethylene, the method of vulcanization has generally involved the use of high temperatures and pressures, e.g., treatment with steam at over 200 p.s.i.g. Further, heat-vulcanizable compositions generally contain chemical vulcanizing agents, and the presence of these during the period when the compositions are being extruded onto the wires at temperatures where good flow is to be obtained can cause premature curing of highly chlorosulfonated polyethylene and hinder the successful coating of the conductor. Additionally, currently available chlorosulfonated polyethylenes have such high dissipation factors and low dielectric constant that they are suitable only for insulating comparatively low voltage carrying, short-length wire.

Unmodified polyethylene can be cross-linked either by irradiating the already coated wire or by preparing a mixture of polyethylene and an organic peroxide such as dicumyl peroxide and then extruding this peroxide-containing polyethylene over the wire, the decomposition of the peroxide effecting cross-linking essentially simultaneously with the extrusion.

Radiation curing has the disadvantage of introducing unsaturation into the polyethylene molecule, thereby adversely affecting its oxidative stability and also degrading its dielectric properties.

Peroxide-induced cross-linking of polyethylene also has certain disadvantages in comparison with applicants' low chlorine- and sulfur-content sulfochlorinated polyethylene:

1. Processing temperatures are considerably higher than for applicants' chlorosulfonated polyethylenes;
2. The scorch resistance of peroxide-crosslinked polyethylene is inferior to that of applicants' chlorosulfonated polyethylene;
3. Applicants' chlorosulfonated polyethylene has superior storage stability compared to peroxide-containing polyethylene;
4. The actual curing of peroxide-containing polyethylene must be carried out in the absence of oxygen under a pressurized inert atmosphere to avoid surface grazing and gas bubbles. The coating of wire under such conditions is difficult and requires complex and expensive apparatus;
5. Applicants' chlorosulfonated polyethylene after curing shows oxidation, weathering and abrasion resistance superior to peroxide-cross-linked polyethylene.
6. Peroxide-crosslinked polyethylene is unstable over extended periods in the presence of high moisture when the conductor is carrying a high voltage.

SUMMARY OF THE INVENTION

It is an object of this invention to provide a chlorosulfonated polyethylene useful as an electrical wire or cable insulation that has electrical properties greatly superior to those of currently known chlorosulfonated polyethylene and physical properties and processability in such applications superior to those of polyethylene.

Further objects and advantages will become apparent from the description of the invention which follows in greater detail.

These and other objects are accomplished according to our invention wherein a polyethylene, as will be more fully hereinafter defined, is sulfochlorinated to a chlorine content of 0.20 and 3.0 weight percent and a sulfur content of 0.05 to 0.80 weight percent.

Chlorosulfonation of polyethylene is conventionally carried out by the so-called Reed process. This process entails sulfochlorination of the polyethylene dissolved in an anhydrous solvent, generally carbon tetrachloride, by chlorine and sulfur dioxide or, alternately, sulfuryl chloride.

The Reed process chlorosulfonation of polyethylene is a free radical process and is usually catalyzed by ultraviolet radiation or by free radical initiators such as organic peroxides or azocompounds. In general, it is desirable to have the polymer completely dissolved, and for this reason, the chlorosulfonation reaction is generally carried out at a high enough temperature to completely dissolve the polyethylene in the solvent. Superatmospheric pressures are frequently employed to achieve this result. Chlorosulfonated polyethylenes produced by this reaction have sulfur contents of 0.8–2.5 percent by weight and chlorine contents of 20–45 percent by weight.

Other polyethylene sulfochlorination processes are described in U.S. Pat. Nos. 3,347,835 and 3,314,835.

In producing the low chlorine- and sulfur-content sulfochlorinated polyethylene of the instant invention, a different procedure is utilized. The polyethylene in finely particulate form, i.e., having a maximum particle size of 20 mesh, is mixed with at least an equal weight of inert, smooth-surfaced particulate matter such as glass or ceramic beads of 1–7 mm. diameter to reduce agglomeration during chlorosulfonation. The polyethylene/glass bead mixture is then charged to a reaction vessel, which is then purged with nitrogen or other inert gas preferably at a temperature of 40° to 100° C. to remove substantially all oxygen and water. The polyethylene/glass bead charge is preferably agitated to facilitate this purging as by rotating or rocking the vessel. Ordinarily, purging for from about 5 to 30 minutes is sufficient. After purging is complete, gaseous sulfur dioxide ($SO_2$) and chlorine ($Cl_2$) are simultaneously passed into the reaction vessel through either the same or separate inlet ports while agitating the charge. No heat need be applied to the polyethylene/glass bead charge, and the $Cl_2$ and $SO_2$ are preferably both at approximately ambient temperature. Special ultraviolet light catalysis is generally not necessary if a glass reaction vessel is utilized. However, the reaction does require some actinic light for initiation and will go only very slowly in the air so an ultraviolet light source is necessary when a metal reaction vessel is utilized. The reaction is mildly exothermic; however, some autogenous warming of the charge generally occurs during the sulfochlorination reaction. The flow rates of $Cl_2$ and $SO_2$ passed into the vessel are not critical. The weight ratio of $SO_2$ to $Cl_2$ passed in can suitably vary from about 2.5:1 to 0.9:1, preferably 1:1 to 2:1. The contact time of $Cl_2$ and $SO_2$ to polyethylene will vary with the gas flow rate. Preferably, the flow rate will be adjusted so as to provide a contact time of from 2–15 minutes, preferably 4–10 minutes. After sufficient $Cl_2$ and $SO_2$ have been passed into the reaction vessel to achieve a chlorine content of 0.2–3.0 weight percent and a sulfur content of 0.05–0.80 weight percent, the gas flow is stopped. This can be ascertained by elemental analysis of an aliquot of the reacted polyethylene. Preferably, the reaction vessel is then purged with nitrogen. In practice, the $C_{12}$ and $SO_2$ flow rate and time conditions that produce the desired chlorine and sulfur content for a given charge and reactor configuration will be determined experimentally and these conditions adhered to in subsequent runs so as to avoid the need for determining the end or the reaction by elemental analysis of the reaction products for each run.

Polyethylenes which can suitably be chlorosulfonated to produce the chlorosulfonated polyethylene of the instant invention include polyethylene produced by most of the currently utilized commercial ethylene polymerization processes. Specifically, the high-pressure, free-radical polymerization process originally developed by I.C.I., Ltd., which produces a low density, branched polyethylene; the medium pressure processes of Standard Oil of Ind. or Phillips Petroleum using molybdenum oxide or chromium oxide, respectively; and the low-pressure, Ziegler-type processes which afford high density, substantially linear polyethylene, all provide suitable polyethylene starting material. Since our chlorosulfonation process produces a chlorosulfonated polyethylene having a melt viscosity the same as or only very slightly higher than that of the starting polyethylene, the main limitation on the choice of starting polyethylene is that its melt viscosity must be such that the chlorosulfonated polymer produced therefrom can be suitably extruded over the wire to be coated. We have found that polyethylene having a melt index ranging from about 0.2 to about 2.2 according to test method ASTM D-1238 is suitable. Preferably, the starting polyethylene has a melt index ranging from about 0.8 to 1.5.

As heretofore indicated, to be really useful, it is necessary that a wire coating be rendered essentially nonthermoplastic, i.e., cured, cross-linked or vulvanized. The cross-linking of the chlorosulfonated polyethylene prepared in accordance with our invention is most suitably effected by incorporating into the chlorosulfonated polyethylene a polybasic metal oxide such as litharge (lead oxide) or magnesia, preferably lead oxide, coaxially extruding this metal oxide-containing chlorosulfonated polyethylene over the wire to be coated and then heating the coated wire for a brief period to complete the cure.

The amount of metal oxide incorporated into the chlorosulfonated polyethylene can suitable range from about 4 percent to about 7 percent weight, preferably 5 to 6 percent. There should also be present from about 0.5 to 1.5 weight percent, preferably 0.75 to about 1.25 weight percent, of a curing accelerator such as dipentamethylenethiuran tetrasulfide or benzothiazyl disulfide.

If desired, minor amounts of other additives, including processing aids, can be added to the chlorosulfonated polyethylene prior to extrusion. However, such other additives ordinarily have a deleterious effect on the electrical properties of the chlorosulfonated polyethylene and their presence is therefore undesirable.

The incorporation of the metal oxide and accelerator into the chlorosulfonated polyethylene is most readily effected by milling a mixture of the polymer, plus the additives, in a rubber mill. However, other conventional additive-incorporation procedures known to the art are also suitable.

Suitable extruder temperature conditions are dictated primarily by the softening point of the chlorosulfonated polyethylene. For chlorosulfonated polyethylene prepared from low density polyethylene, suitable extrusion temperature conditions are screw, about 80°–90° C.; barrel, about 90°–95° C.; and head, about 95°–100° C.

For high density polyethylene, suitable temperature conditions are screw, about 130°–140° C.; barrel, about 140°–145° C.; and head, about 140°–145° C.

Suitable postextrusion curing conditions are about 165°–190° C. for 10–30 minutes, preferably 15–20 minutes. The exact temperature and the duration of this postcuring treatment will, of course, vary primarily with the thickness of the coating being cured.

The thickness of the chlorosulfonated polyethylene coating applied to the wire will vary, of course, with the diameter of the wire and the voltage and current it is intended to carry. Ordinarily, a thickness of from about 0.75 inch to about 2.0 inches will be utilized.

Peroxide-cured polyethylene has a dielectric constant of about 2.3 at 60 cycles/sec. and a dissipation factor of about 0.004 at 60 cycles/sec. The highly chlorosulfonated polyethylenes currently known have a dielectric constant of at least about 7.5 at 60 cycles/sec. and a dissipation factor of greater than about 0.2 at 60 cycles/sec.

As heretofore indicated, such chlorosulfonated polyethylene is therefore unsuitable for high-voltage, long-distance electrical lines notwithstanding its good physical properties. Our chlorosulfonated polyethylene, in contradistinction, has a dielectric constant of about 2.3 at 60 cycles/sec. and a dissipation factor of about 0.002 to 0.005 at 60 cycles/sec. Our material is thus seen to be many orders of magnitude superior electrically to known chlorosulfonated polyethylenes and at least equal to polyethylene electrically, while having significant physical property and processing advantages over the latter.

The invention can be more fully understood by reference to the following examples. All parts are parts by weight unless otherwise expressly noted.

EXAMPLE 1

A series of polyethylene chlorosulfonation runs were carried out. In each case, the charge was 120 grams of polyethylene of 20–40 mesh size and 350 grams of 3–6 mm.-diameter glass beads. The reaction vessel was a three-necked glass flask. After charging the polyethylene and glass beads, the flask was immersed in an oil bath heated to about 55° C. and rotated while nitrogen was passed through the flask for 0.5 hour. The flask was then removed from the oil bath, the nitrogen flow terminated, and $SO_2$ and $Cl_2$ passed into the flask through separate inlets while continuing to rotate the flask. The $SO_2$ and $Cl_2$ flow rates and flow times are shown in table I. After termination of $SO_2$ and $Cl_2$ input, the flask was again placed in the oil bath and purged with nitrogen for 0.5 hour. Chlorine and sulfur content of the products are also shown in table I.

TABLE I

| Run No. | Flow rate (g./hr.) $SO_2$ | Flow rate (g./hr.) $Cl_2$ | Flow time (min.) | Wt. percent in product Sulfur | Wt. percent in product Chlorine |
|---|---|---|---|---|---|
| 1 | 45 | 50 | 5 | 0.80 | 1.0 |
| 2 | 45 | 50 | 5 | 0.24 | 1.4 |
| 3 | 55 | 27 | 5 | 0.18 | 0.8 |
| 4 | 50 | 25 | 3 | 0.10 | 0.4 |
| 5 | 55 | 27 | 10 | 0.70 | 1.7 |
| 6 | 45 | 45 | 3 | 0.18 | 1.7 |
| 7 | 45 | 45 | 2 | 0.10 | 1.4 |
| 8 | 45 | 50 | 5 | 0.40 | 2.6 |
| 9 | 55 | 27 | 8 | 0.28 | 0.91 |
| 10 | 55 | 27 | 15 | 0.22 | 0.64 |
| 11 | 60 | 30 | 10 | 0.15 | 0.44 |
| 12 | 60 | 30 | 12 | 0.08 | 0.25 |

The polyethylene utilized in runs 1–9 was a low density polyethylene having a melt index of 2.0. The polyethylene utilized in runs 10–12 was a high-density, Ziegler-type polyethylene having a melt index of 0.20.

EXAMPLE 2

Certain of the chlorosulfonated polyethylenes prepared in example 1 (runs 1–3 and 8–10 were compounded (100 parts) with lead oxide (five parts) and dipentamethylenethiuram tetrasulfide (one part) on a two-roll rubber mill with the gap set at 0.004 inches. For samples 1–3, 8 and 9, the milling temperature was 165° F. for 8 min. It should be noted that, to incorporate peroxide into the same polyethylene before chlorosulfonation, it requires a milling temperature of about 195° F. This increased temperature results in increased scorching and product loss. Sample 10, prepared from high density polyethylene, was milled at 290° F. for 6 min. To mill the identical unchlorosulfonated polyethylene requires a milling temperature of 310° F., again causing increased loss from scorching.

The compounded samples were then cured (cross-linked) by heating in air for 15 minutes. The cure temperature was 330° F. for samples 1, 2 and 8 and 375° F. for samples 9–10. Sample 3 was cured for 15 minutes at 330° F. and 15 minutes at 375° F. All samples were fully cured as indicated by low swell values in decalin.

Physical and electrical properties are tabulated in table II. Sample 13 is cross-linked unchlorosulfonated polyethylene of the type used to prepare samples 1–9. The formulation of sample 13 was 100 parts polyethylene, one part cadmium stearate lubricant, 0.5 part 1,2-dihydro-2,2,4-trimethylquinolin antioxidant, and 3.0 parts dicumyl peroxide curing agent. It was cured by heating for 15 minutes at 2,000 p.s.i. and 330° F.

TABLE II

| Sample | U.E. (percent) | U.T.S. (p.s.i.) | Dielectric constant | | | Dissipation factor | | |
|---|---|---|---|---|---|---|---|---|
| | | | 60 cycles/sec. | 1 kc./sec. | 1 mc./sec. | 60 cycles/sec. | 1 kc./sec. | 1 mc./sec. |
| 1 | 540 | 1,730 | 2.51 | 2.50 | 2.49 | 0.0042 | 0.0051 | 0.0134 |
| 2 | 630 | 2,520 | 2.37 | 2.35 | 2.38 | 0.0045 | 0.0045 | 0.0053 |
| 3 | 660 | 2,290 | 2.27 | 2.27 | 2.32 | 0.0020 | 0.0014 | 0.0033 |
| 8 | 650 | 2,390 | 2.55 | 2.53 | 2.53 | 0.0051 | 0.0036 | 0.0094 |
| 9 | 640 | 2,440 | 2.32 | 2.32 | 2.38 | 0.0030 | 0.0029 | 0.0044 |
| 10 | 90 | 2,650 | 2.36 | 2.36 | 2.42 | 0.0022 | 0.0024 | 0.0023 |
| 13 | 570 | 2,410 | 2.28 | 2.27 | 2.29 | 0.0039 | 0.0034 | 0.0007 |

EXAMPLE 3

The same physical and electrical properties were determined for a sample of commercial cross-linked chlorosulfonated polyethylene (Hypalon) which was found to contain 0.9 weigh percent sulfur and 34.5 weight percent chlorine. Ultimate elongation (percent) = 600; ultimate tensile strength (p.s.i.) = 2,000; dielectric constant 60 cycles/sec. = 6.27; and dissipation factor 60 cycles/sec. = 0.08.

EXAMPLE 4

The Randall-Sticknes Heat Distortion Test is widely used by the wire and cable industry. Samples 2, 10 and 13 of example 3 and the Hypalon of example 3 were subjected to this test. The test involves taking a cured piece of polymer 0.040 inches thick and heating it in an oven at 150° C. for 1 hour. A 1,000-gram load is then applied to the test piece for 1 hour at 150° C. The sample is cooled to room temperature over a 1-hour period under load. Samples 2 and 10 showed no measurable distortion. Sample 13 and Hypalon both showed distortion of approximately 5 percent.

EXAMPLE 5

About 100 feet of No. 2 insulated wire (one-fourth inch) was prepared using a sample of chlorosulfonated polyethylene prepared in accordance with the procedure of run 9 example 1. The chlorosulfonated polyethylene (100 parts), lead oxide (five parts) and dipentamethylenethiuram tetrasulfide (one part) were compounded as in example 2. This compounded mixture was fed into the hopper of an extruder of the type known as a crosshead tuber. The tuber head was designed to coaxially extrude ¾ inch-thick insulation over the wire. The barrel of the extruder was maintained at 170° F. and the head of the extruder was maintained at about 270° F. The insulated wire was cooled slightly with air and wrapped on a wooden creel and then cured for 15 min. in an air oven at 330° F. The cured insulation showed no indication of blistering or porosity.

We claim:

1. Chlorosulfonated polyethylene having a melt index ranging from about 0.2 to 2, a chlorine content of 0.2 to 3.0 weight percent, and a sulfur content of 0.05 to 0.80 weight percent.

2. The chlorosulfonated polyethylene of claim 1 wherein said melt index ranges from about 0.8 to 1.5.

* * * * *